United States Patent
Nigam et al.

(10) Patent No.: US 9,558,168 B2
(45) Date of Patent: *Jan. 31, 2017

(54) MANAGING PRODUCT CONFIGURATION

(71) Applicant: International Business Machines Corporation, Armonk, NY (US)

(72) Inventors: Gaurav Nigam, Kanpur (IN); Arun Ramakrishnan, Tamil Nadu (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,633

(22) Filed: May 12, 2016

(65) Prior Publication Data

US 2016/0246768 A1 Aug. 25, 2016

Related U.S. Application Data (63) Continuation of application No. 14/976,039, filed on Dec. 21, 2015, now Pat. No. 9,372,845, which is a continuation of application No. 14/196,213, filed on Mar. 4, 2014.

(51) Int. Cl.
*G06F 17/24* (2006.01)
*G06F 9/44* (2006.01)
(Continued)

(52) U.S. Cl.
CPC ........... *G06F 17/241* (2013.01); *G06F 3/0481* (2013.01); *G06F 3/04842* (2013.01);
(Continued)

(58) Field of Classification Search
CPC  G06F 17/241; G06F 17/30091; G06F 9/4446; G06F 17/2881; G06F 17/30864
See application file for complete search history.

(56) References Cited

U.S. PATENT DOCUMENTS 7,225,399 B2   5/2007  Watson
7,882,090 B2   2/2011  Richardson et al.
(Continued)

OTHER PUBLICATIONS

IBM, "Automatic Help Page Generation Based on Actual UI Components in Calling Page Interface", IP.com Prior Art Database Technical Disclosure, IPCOM000156753D, Aug. 2, 2007, <http://ip.com/IPCOM/000156753>.
(Continued)

*Primary Examiner* — Kyle Stork
(74) *Attorney, Agent, or Firm* — John W. Hayes; William H. Hartwell (57) ABSTRACT

A computer-implemented method, carried out by one or more processors, for managing product configuration files. In an embodiment, the method comprises the steps of receiving, by one or more processors, a document containing one or more annotations, wherein the one or more annotations are associated with one or more files; determining, by one or more processors, an annotation has been selected from the one or more annotations to access a particular file associated with the selected annotation; linking, by one or more processors, a storage location for the particular file associated with the selected annotation to the received document; and displaying, by one or more processors, content of the particular file associated with the selected annotation in the received document.

1 Claim, 5 Drawing Sheets (51) Int. Cl.
  *G06F 17/30* (2006.01)
  *G06F 3/0481* (2013.01)
  *G06F 3/0484* (2013.01)
  *G06F 17/21* (2006.01)
  *G06F 17/22* (2006.01)
(52) U.S. Cl.
  CPC .......... *G06F 9/4446* (2013.01); *G06F 17/211* (2013.01); *G06F 17/2235* (2013.01); *G06F 17/30091* (2013.01); *G06F 17/30106* (2013.01)

(56) References Cited

U.S. PATENT DOCUMENTS

| | | |
|---|---|---|
| 8,099,664 B2 | 1/2012 | Kureshy et al. |
| 8,341,652 B2 | 12/2012 | Lutterkort |
| 8,386,932 B2 | 2/2013 | Shewchuk |
| 8,775,933 B2 | 7/2014 | Harrington |
| 9,372,845 B2 | 6/2016 | Nigam et al. |
| 2004/0100498 A1 | 5/2004 | Dietz et al. |
| 2009/0132919 A1 | 5/2009 | Allen, Jr. et al. |
| 2009/0183066 A1 | 7/2009 | Crawford et al. |
| 2009/0235349 A1 | 9/2009 | Lai et al. |
| 2015/0254221 A1 | 9/2015 | Nigam et al. |

OTHER PUBLICATIONS

"Method and System for Displaying an Enhanced Help User Interface", Authors Disclosed Anonymously, IP.com Prior Art Database Technical Disclosure, IPCOM000225873D, Mar. 10, 2013, <http://ip.com/IPCOM/000225873>.

"Tooltip—Wikipedia, the free encyclopedia", last modified Nov. 7, 2013 <http://en.wikipedia.org/wiki/Tooltip>.

MANAGING PRODUCT CONFIGURATION

BACKGROUND OF THE INVENTION

Typical Information Technology (I/T) environments contain various products, such as servers and databases, operating in conjunction with one another. Each operating product within the environment has a specific product configuration utilizing property and configuration files to govern the operations with the environment. As a result, any changes performed to the property or configuration files may be reflected in the product operations. It is common for the property and configuration files to be located on multiple servers for all of the multiple product configurations within the environment. Each server containing property and configuration files can have a different method for accessing the files, such as different verification methods each time the property and configuration files are accessed.

A product's configuration is typically maintained through life cycles, where each life cycle can require an update of the property and configuration files. An administrative user maintaining the product's configuration can read the property and configuration files but has to access each file location to determine if any updates are required, or if any changes are required in the files. The process for accessing a property and configuration file can take a number of steps and may differ for other property and configuration files which are to be accessed by the administrative user.

SUMMARY

Embodiments of the present invention disclose a method, computer program product and computer system for managing product configuration files. A computer-implemented method, carried out by one or more processors, for managing product configuration files. In an embodiment, the method comprises the steps of receiving, by one or more processors, a document containing one or more annotations, wherein the one or more annotations are associated with one or more files; determining, by one or more processors, an annotation has been selected from the one or more annotations to access a particular file associated with the selected annotation; linking, by one or more processors, a storage location for the particular file associated with the selected annotation to the received document; and displaying, by one or more processors, content of the particular file associated with the selected annotation in the received document.

DETAILED DESCRIPTION

Embodiments in accordance with the present invention manage product configuration files by receiving a document containing one or more annotations, wherein the one or more annotations are associated with one or more product configuration files. Embodiments in accordance with the present invention have the ability to determine an annotation has been selected by a user from the one or more annotations to access a particular file associated with the selected annotation. Responsive to determining the annotation has been selected, linking a storage location for the particular file associated with the selected annotation to the received document. Embodiments in accordance with the present invention also have the ability to display content of the particular file associated with the selected annotation in the received document.

Figure 1:
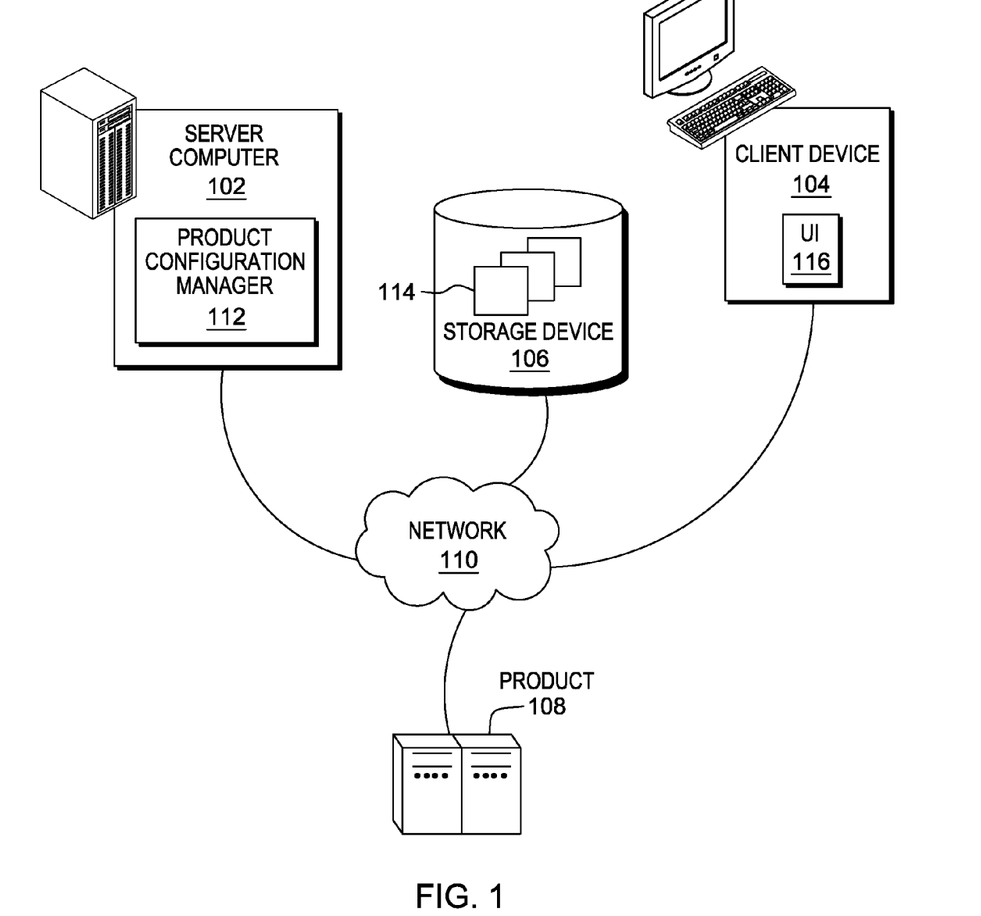
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, storage device 106, and product 108 all interconnected over network 110.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Product configuration manager 112, residing in server computer 102, has the ability to manage multiple property and configuration files 114 stored in multiple storage locations within storage device 106. Property and configuration files 114 contain content pertaining to product configuration of product 108. In this embodiment, product configuration manager 112 has the ability to receive help documents pertaining to product 108, and annotate the help documents for any references to property and configuration files 114. Product configuration manager 112 can utilize the annotations in the help documents to query the storage locations for the property and configuration files. Product configuration manager 112 can link the content of the property and configuration files such that when an administrative user selects an annotation, product configuration manager 112 can display the content and receive edits performed to the property and configuration file.

Property and configuration files 114 contain configuration information of product 108 which govern operations of product 108. In this embodiment, property and configuration files 114 reside in storage device 106, where the file locations for property and configuration files 114 differ from one another. Each file location for property and configuration files 114 can require various steps of verification before the content of property and configuration files 114 is deemed accessible.

In various embodiments of the present invention, product 108 can be a server computer, a database, a storage device, or any programmable device capable of communicating with server computer 102, client device, and storage device 106 via network 110. Product 108 operates through property and configuration files 114. In this embodiment, the administrative user of client device 104 utilizes user interface 116 to monitor product 108 through product configuration manager 112.

In general, network 110 can be any combination of connections and protocols that will support communications among server computer 102, client device 104, storage device 106, and product 108. Network 110 can include, for example, a local area network (LAN), a wide area network (WAN) such as the internet, a cellular network, or any combination of the preceding, and can further include wired, wireless, and/or fiber optic connections.

In one embodiment, product configuration manager 112 may be a web service accessible via network 110 to a user of a separate device, e.g., client device 104. In another embodiment, product configuration manager 112 may be operated directly by a user of server computer 102.

User interface 116 on client device 104 displays information that any one of the processes of product configuration manager 112 may display to a user. User interface 116 can be, for example, a graphical user interface (GUI) or a web user interface (WUI) and can display text, documents, web browser windows, user options, application interfaces and instructions for operation. In various embodiments of the present invention, client device 104 can be a laptop computer, a tablet computer, a netbook computer, a personal computer (PC), a desktop computer, a personal digital assistant (PDA), a smartphone, or any programmable electronic device capable of communicating with server computer 102, storage device 106, and product 108 via network 110.

Figure 2:
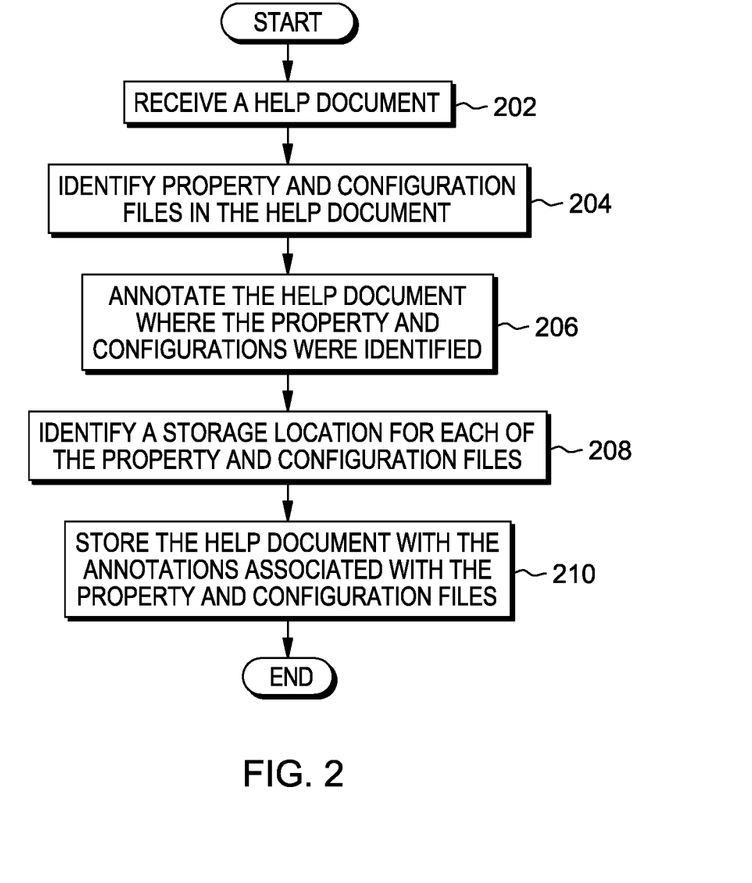
FIG. 2 is a flowchart depicting operational steps of a product configuration manager for annotating a help document, in accordance with an embodiment of the present invention.

FIG. 2 is a flowchart depicting operational steps of a product configuration manager for annotating a help document, in accordance with an embodiment of the present invention.

Product configuration manager 112 receives a help document (step 202). In this embodiment, product configuration manager 112 receives the help document from an administrative user who is uploading the help document with the addition of a new product 108 (e.g., server). The help document contains various information pertaining to the operations of the product, as well as configuration information for the product. The configuration information consists of property and configuration files which handle various parameters of the product. Along with receiving the help document, product configuration manager 112 receives a list of the property and configuration files associated with the product.

Product configuration manager 112 identifies property and configuration files in the help document (step 204). In this embodiment, product configuration manager 112 utilizes the list of property and configuration files to scan the help document and identify any reference to a property and configuration file. In another embodiment, the administrative user can sort through the help document and specify where there is a reference to a property and configuration file. Product configuration manager 112 can prompt a window with a list of the property and configuration files and the administrative user can specify a particular property and configuration file being referenced in the help document. The administrative user has the ability to identify any variation to the property and configuration file referenced in the help document. For example, if the help document reads "Automatic Configuration File" and the administrative user identifies this as a reference to a property and configuration file, product configuration manager 112 allows for the user to identify the property and configurations file as "autoconfig.sys", since it is a variation of "Automatic Configuration File".

Product configuration manager 112 annotates the help document where the property and configuration files were identified (step 206). In this embodiment, product configuration manager 112 annotates the help document where the property and configuration files were identified by utilizing a hyperlink. Continuing from the previous example, if the help document reads "Automatic Configuration File", then product configuration manager 112 annotates that phrase by creating a hyperlink to the property and configuration file "autoconfig.sys". Product configuration manager 112 can highlight the hyperlink, "Automatic Configuration File" in a different color from the rest of the text in the help document. Product configuration manager 112 can also highlight the hyperlink in an underlined manner, such that it is distinguishable to the user viewing the help document.

Product configuration manager 112 identifies a storage location for each of the property and configuration files (step 208). Product configuration manger 112 has the ability to query a directory to identify a storage location for each of the identified property and configuration files in the help document. The directory can contain storage locations (e.g., server name) on which particular property and configuration files are stored. Product configuration manager 112 can maintain the directory by updating the list with newly introduced property and configuration files for new products. In the embodiment where product configuration manager 112 annotates the help document with hyperlinks, product configuration manager 112 can associate each hyperlink with a storage location for a property and configuration file. As a result, product configuration manager 112 can also associate the content of the property and configuration file with the hyperlink.

Product configuration manager 112 stores the help document with the annotations associated with the property and configuration files (step 210). Product configuration manager 112 can store the annotated help document under a different file name or file extension to differentiate the annotate help document from the help document received in step 202. The annotated help document allows for product configuration manager 112 to link the annotations in the help document to storage locations of property and configuration files. Linking the annotations to storage locations allows for access to content of each property and configuration file from the help document. In another embodiment, product configuration manager 112 can store the annotated help document in an archive where it can be accessed by an administrative user.

Figure 3:
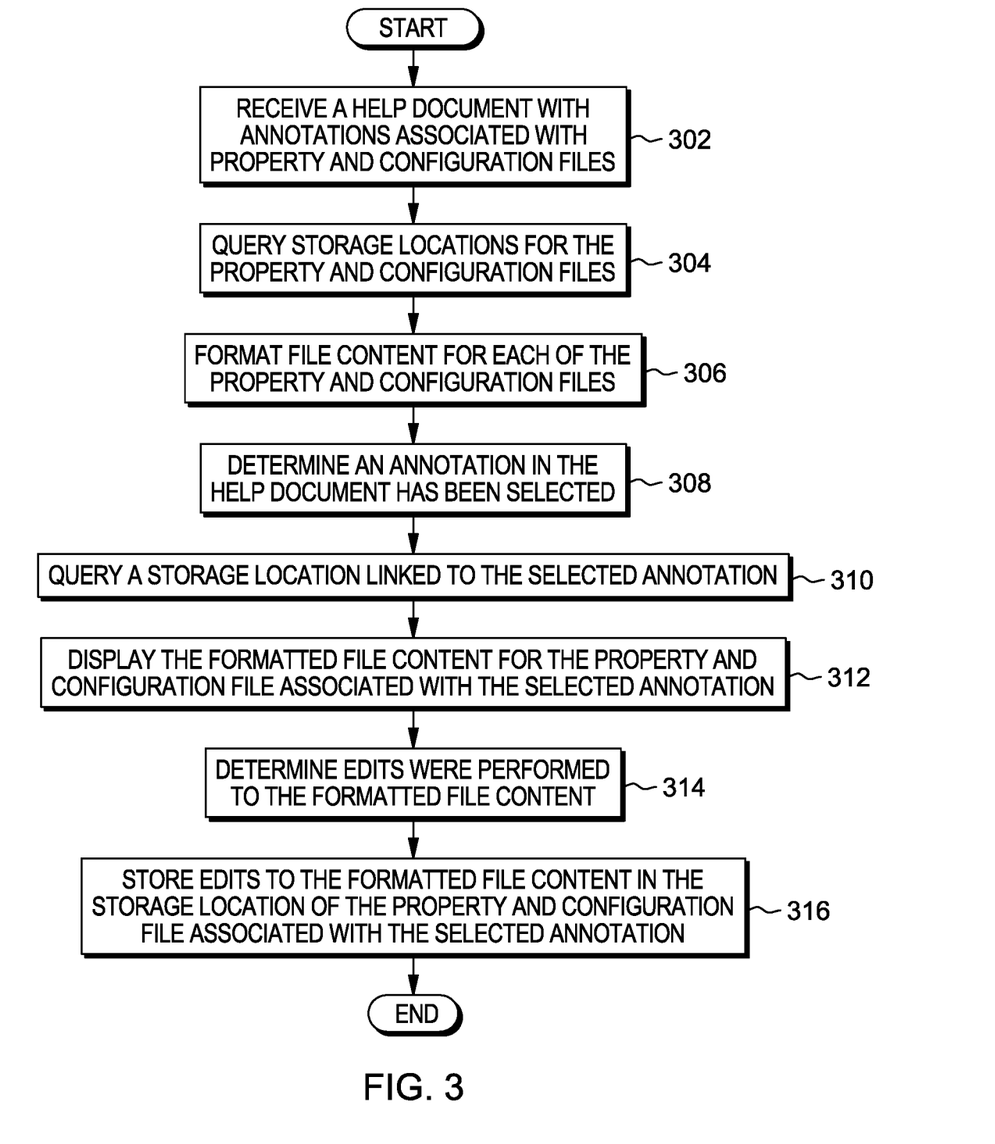
FIG. 3 is a flowchart depicting operational steps of a product configuration manager for providing an annotated help document with the annotations linking to content in respective file locations, in accordance with an embodiment of the present invention.

FIG. 3 is a flowchart depicting operational steps of a product configuration manager for providing an annotated help document with the annotations linking to content in respective file locations, in accordance with an embodiment of the present invention.

Product configuration manager 112 receives a help document with annotations associated with property and configuration files (step 302). In this embodiment, an administrative user queries product configuration manager 112 for an annotated help document. Product configuration manager 112 queries an archive containing the annotated help document, receives the annotated help document, and provides the annotated document to the querying administrative user. Upon receiving the annotated help document, product configuration manager 112 can display the annotated help document in a user interface (e.g., user interface 116) on the computer device (e.g., client device 104) from which the administrative user sent the query.

Product configuration manager 112 queries storage locations for the property and configuration files (step 304). The annotated help document contains annotations where each annotation is associated with a property and configuration file stored in a particular storage location. Product configuration manager 112 queries each storage location by initializing a connection to determine that each storage location is active. For example, a particular property and configuration file is stored in a storage location which requires user verification. Product configuration manager 112 can utilizes information from the administrative user to complete such verifications. In the event product configuration manager 112 cannot initialize a storage location, product configuration manager can prompt a window viewable to the administrative user with the name of the property and configuration files whose storage location is inactive.

Product configuration manager 112 formats file content for each of the property and configuration files (step 306). In this embodiment, product configuration manager 112 identifies a file format for each property and configuration file and determines whether or not to alter the format of the file such that the file can be viewed when prompted by the administrative user viewing the annotated help document. In one example, product configuration manager 112 formats content of the property and configuration file such that product configuration manager 112 can display the content in the user interface. In another example, product configuration manager 112 does not format content of the property and configuration file since product configuration manager 112 can display the content without requiring such formatting.

Product configuration manager 112 determines an annotation in the help document has been selected (step 308). In this embodiment, product configuration manager 112 determines an annotation is selected when an administrative user, utilizing a cursor, clicks on a hyperlink associated with a property and configuration file. In one example, product configuration manager 112 determines that the annotation which was selected with the cursor is the property and configuration file for which the administrative user wants to view the content. In another example, product configuration manager 112 can prompt a window in the user interface querying the administrative user if the annotation selected with the cursor is correct. If the administrative user inadvertently selected the annotation, the prompted window prevents product configuration manager 112 from proceeding until the administrative user specifies that the selection was intentional.

Product configuration manager 112 queries a storage location linked to the selected annotation (step 310). Product configuration manager 112 queries the storage location to establish a link between the selected annotation and the associated property and configuration file. In this embodiment, product configuration manager 112 receives the most recent content of the property and configuration file at the storage location. Product configuration manager 112 establishes a link to the storage location of the property and configuration file, where any edits product configuration manager 112 receives from an administrative user are stored in real time at the stored location. In another embodiment, product configuration manager 112 establishes a link to the storage location of the property and configuration file, where the link remains idle between the storage location and product configuration manager 112 while edits are performed to the content of the property and configuration file.

Product configuration manager 112 displays the formatted file content for the property and configuration file associated with the selected annotation (step 312). In this embodiment, product configuration manager 112 displays, in the user interface, the formatted file content of the property and configuration file in a window overlaying the help document. The overlaying window allows for the administrative user to review and input any edits accordingly. The overlaying window can remain active until product configuration manager 112 receives an input from the administrative user to close the overlaying window. In another embodiment, the overlaying window containing the formatted file contents of the property and configuration file is transparent where the administrative user is able to simultaneously view the content in the window as well as the help document.

Product configuration manager 112 determines edits were performed to the formatted file content (step 314). Product configuration manager 112 identifies if edits were performed by the administrative user to the formatted file content in the overlaying window. In the event product configuration manager 112 identifies that new matter was added to the formatted file content or matter was removed from the formatted file content, product configuration manager 112 determines that the content of the property and configuration file has been altered.

Product configuration manager 112 stores edits to the formatted file content in the storage location of the property and configuration file associated with the selected annotation (step 316). Since product configuration program 112 links to the storage location of the property and configuration file, product configuration program 112 can store any edits an administrative user performs in the overlaying window. In this embodiment, product configuration manager 112 continuously stores edits to the formatted file content in the storage location of the property and configuration file. In another embodiment, product configuration program 112 stores edits to the formatted content in the storage location of the property and configuration file when product configuration program 112 determines the overlaying window was closed by the administrative user.

Figure 4A:
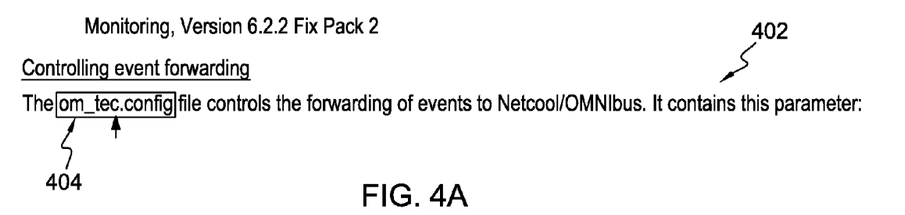
FIG. 4A illustrates a scenario for which a product configuration manager links content of a property and configuration file with an annotation in a help document, in accordance with an embodiment of the present invention.

FIG. 4A illustrates a scenario for which a product configuration manager links content of a property and configuration file with an annotation in a help document, in accordance with an embodiment of the present invention.

In this example scenario, product configuration program 112 has previously received a help document where the help document contains references to property and configuration files. In excerpt 402 of the help document, product configuration program 112 identifies "om_tec.config" as a reference to a property and configuration file. Product configuration program 112 identifies the storage location for "om_tec.config" and annotates the reference with hyperlink 404. Hyperlink 404 allows for an administrative user of product configuration program 112 to link with the storage location for "om_tec.config" and perform any edits to the property and configuration file. Subsequent to product configuration linking hyperlink 404 with the storage location, a cursor can select "om_tec.config" to access the property and configuration file. Hyperlink 404 is distinguishable from the rest of excerpt 402 since product configuration program 112 assigns a different font color and underlines hyperlink 404.

Figure 4B:
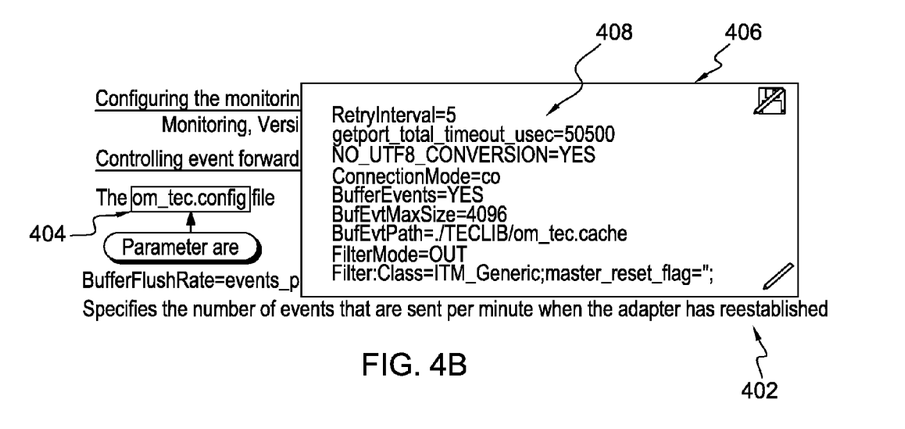
FIG. 4B illustrates a scenario for which a product configuration manager displays content of a property and configuration file of a help document, in accordance with an embodiment of the present invention.

FIG. 4B illustrates a scenario for which a product configuration manager displays content of a property and configuration file of a help document, in accordance with an embodiment of the present invention.

Continuing from the example discussed in FIG. 4A, product configuration program 112 determines hyperlink 404 from excerpt 402 was selected with a cursor signaling that an administrative user wants to view the content of property and configuration file. Product configuration manager 112 queries the storage location associated with hyperlink 404, formats the content, and links the property and configuration file such that product configuration manager 112 displays the content of the property and configuration file in overlaying window 406. In this example, overlaying window 406 is not transparent and becomes the focus over the help document. Overlaying window 406 contains formatted file content 408 representative of the content in the property and configuration file associated with hyperlink 404.

Figure 5:
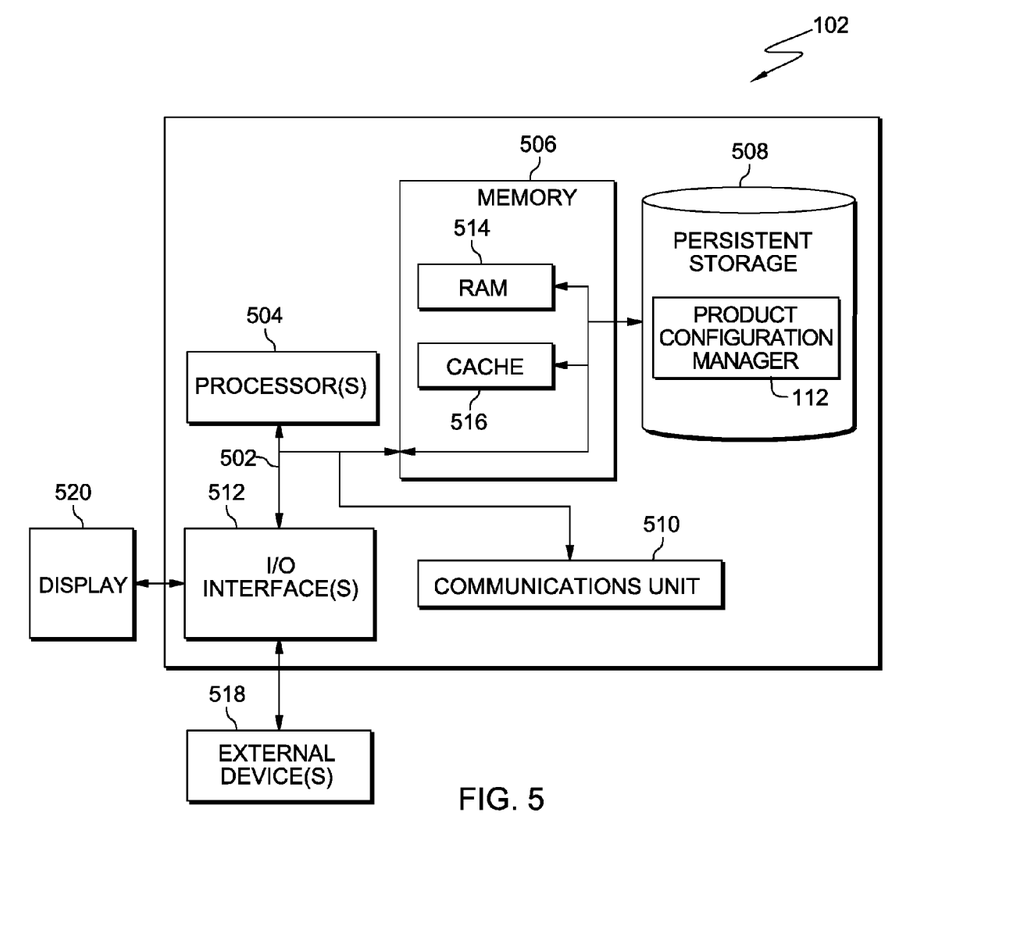
FIG. 5 is a block diagram of components of a computer system, such as the computer server of FIG. 1, in accordance with an embodiment of the present invention.

FIG. 5 depicts a block diagram of components of a computer, such as server computer 102, operating product configuration manager 112 within the distributed data processing environment, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage medium.

Product configuration manager 112 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by server computer 102. In these examples, communications unit 510 includes one or more wireless network interface cards. Communications unit 510 may provide communications through the use of either or both physical and wireless communications links. Computer programs and processes, such as product configuration manager 112, may be downloaded to persistent storage 508 through communications unit 510, or uploaded to another system through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520.

Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more non-transitory computer readable tangible storage media and program instructions stored on at least one of the one or more storage media, the program instructions comprising:
program instructions to receive a help document containing plain text references to one or more product configuration files embedded in the content of the help document, wherein the one or more product configuration files embedded in the content of the help document configure a particular product for an operating environment;
program instructions to identify the plain text references to the one or more product configuration files;
program instructions to identify one or more storage locations associated with the plain text referenced one or more product configuration files;
program instructions to annotate the help document with the identified plain text references to the one or more product configuration files embedded in the content of the document, wherein each annotation links a plain text reference to the one or more product configuration files to an identified storage location;
program instructions to receive the help document containing one or more annotations, wherein the one or more annotations are associated with one or more product configuration files;
program instructions to determine an annotation has been selected from the one or more annotations to access a particular product configuration file associated with the selected annotation;
program instructions to format content of the particular product configuration file associated with the selected annotation, wherein formatting allows for the content to be displayed in the received document;

program instructions to link a first storage location for the particular product configuration file associated with the selected annotation to the received document;

program instructions to display the content of the particular product configuration file associated with the selected annotation in an overlaying window in the received document;

program instructions to determine an edit was performed to the content of the particular product configuration file;

program instructions to remove the content of the particular product configuration file with the edit from the display in the overlaying window in the received help document; and program instructions to store the content of the particular product configuration file with the edit at the first storage location for the particular product configuration file.

* * * * *